April 21, 1970   LARS-ERIK TAMMELIN ET AL   3,507,622
ARRANGEMENT FOR INDICATING THE PRESENCE OF IMPURITIES AS WELL
AS CONTAMINATION AND POISONOUS SUBSTANCES IN AIR AND GAS
Filed June 30, 1967                                    5 Sheets-Sheet 1
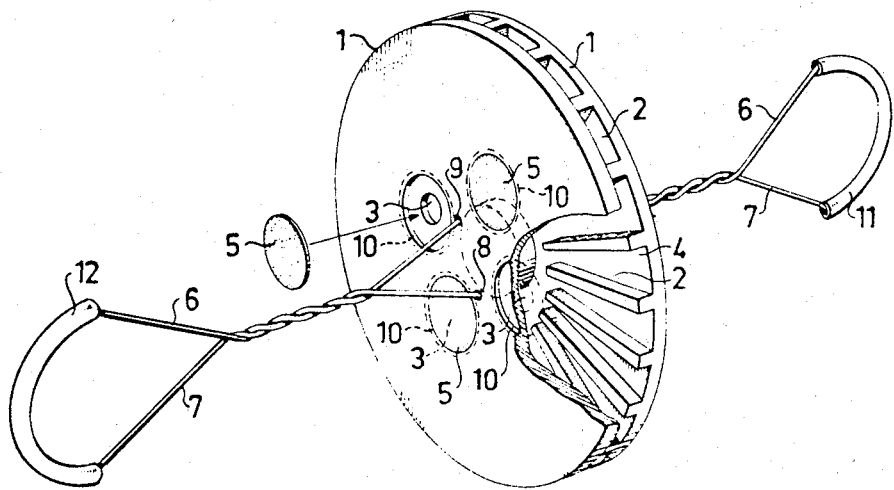
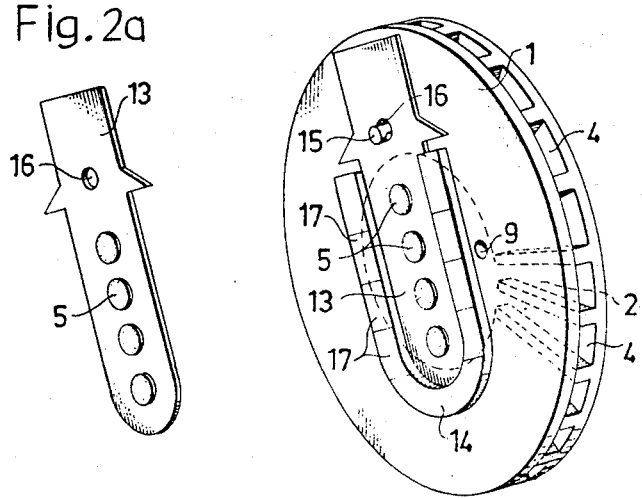
INVENTOR.
LARS-ERIK TAMMELIN
ARNOLD BRANTTE
BY

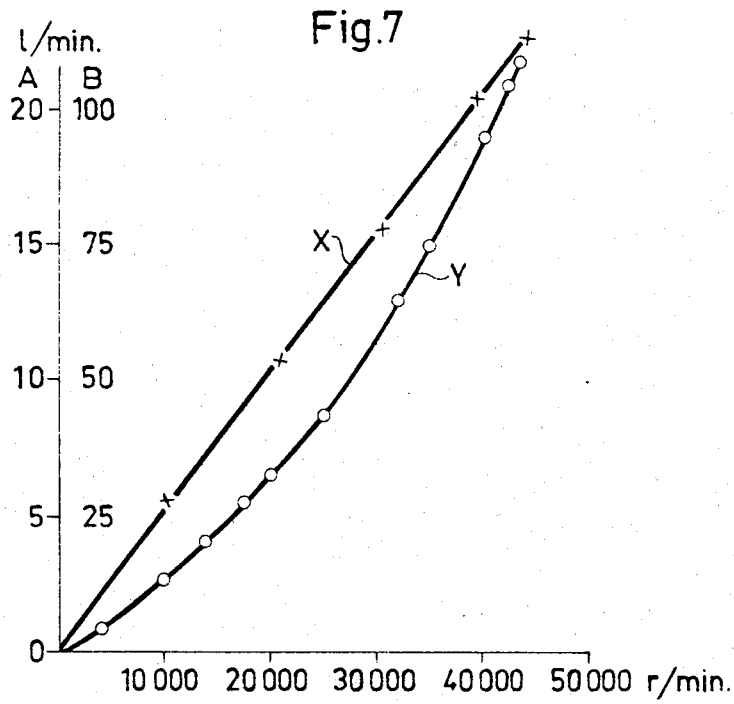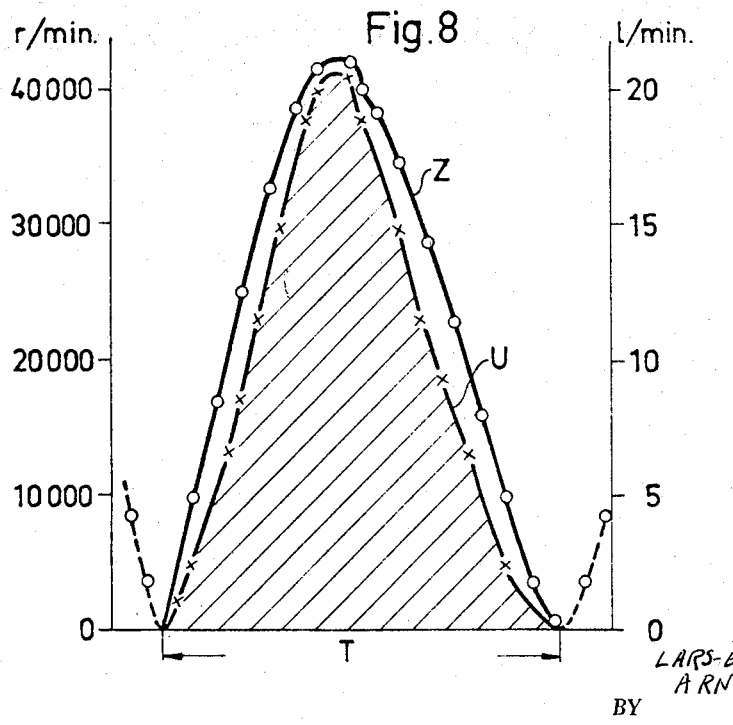

3,507,622
ARRANGEMENT FOR INDICATING THE PRESENCE OF IMPURITIES AS WELL AS CONTAMINATION AND POISONOUS SUBSTANCES IN AIR AND GAS

Lars-Erik Tammelin, Utflyktsvagen 31, Bromma, Sweden, and Arnold Brantte, Hasselstigen 4, Solna, Sweden
Filed June 30, 1967, Ser. No. 650,535
Claims priority, application Sweden, July 6, 1966, 9,224/66
Int. Cl. G01n 31/22, 33/00
U.S. Cl. 23—254                    8 Claims

ABSTRACT OF THE DISCLOSURE

The invention relates to an arrangement for quantitatively and/or qualitatively determining or indicating the presence of impurities and harmful substances in air and other gases or vapours. The arrangement includes a disc which is caused to rotate at very high speed by means of driving elements and which presents a number of substantially radial channels opening out into outlet ports and communicating with intake ports which are provided with indicating means. Due to the high speeds at which the disc rotates the discs will act as a pump sucking the sample medium through the indicating means, which are thereby caused to indicate the presence of such substances in the air, gas or vapour.

BACKGROUND

The present arrangement is concerned with an arrangement for indicating preferably, but not exclusively, the presence of contaminating substances and impurities in air, gas or vapour by means of indicating means carried by a rotatable member.

The main object of the invention is to provide an arrangement for detecting and indicating the presence of contaminating substances and impurities in air and other gases, or vapours, said arrangement being reliable and adapted to operate rapidly even though its construction is simple.

The arrangement according to the invention is intended firstly to enable a rotatable disc to be rotated at high speeds so that the disc may be designed in a simple manner as an air or gas pump, presenting a sufficiently high performance to enable it to be used for taking up and concentrating or enriching gases, vapours and aerosols; and secondly to enable several samples to be taken or tests to be made in one and the same working operation.

In the following description the expression "air" also includes other gases or vapours to be tested.

The presence of a plurality of various substances in the air can be indicated by using indicating means combined with different reactants.

Such an arrangement, for instance, can be used to great advantage within the national defense organization to indicate and/or to detect the presence of chemical and biological weapons. Examples for civil purposes are for instance indication of carbon oxide in garages, vehicles or dwellings as well as detecting hydrocyanic acid after fumigation against vermin. Gas analysis and alcohol tests are examples of additional fields in which the present invention can be used.

Prior art apparatus intended for this purpose are, as a rule, very complicated and hence not suited for indicating rapidly, but nevertheless reliably, the presence of contaminating matter and impurities. A known arrangement includes a rotatably arranged circular disc, around the periphery of which there are disposed indicating means which are brought into contact with the air to be tested upon rotation of the disc. However, this arrangement, is encumbered with a number of particularly serious disadvantages. First and foremost the quantity of air from which the sample air is taken cannot be satisfactorily measured, thus rendering a quantitative determination of contaminating substances and impurities impossible. Further, the sample air becomes depleted during the sampling process, because the indicating means rotate in the same volume of air as that from which the sample is taken and simultaneously the rate in which air absorbed or picked up depends upon the particle size of the contaminating matter or impurities, since small particles upon rotation of the indicating means show a stronger tendency than large particles to deviate to one side of the indicating means, because cushions of air will be formed in front of said indicating means. As a result even small variations in rotational speed of the disc lead to changed absorbing or pick-up conditions, in that a reduction in the speed of rotation gives priority to a pick-up of large particles, resulting in an inaccurate test. The known devices also require relatively complicated driving means.

The above mentioned disadvantages are eliminated by the arrangement according to the invention, which comprises a pump-like particularly constructed rotatable body providing for the necessary flow of air through one or more indicating means, and arranged to rotate in the air at a partciularly high rotational speed by means of a known, manual or power driven arrangement.

The novel, characteristic features of the invention substantially reside in that the rotatable member comprises a disc having substantially radial channels, which at the periphery of the disc open out into ports serving as air outlets, and which adjacent to the centre of the disc communicate with ports disposed in the disc and serving as air intakes including indicating means.

The disc is adapted to rotate in a known manner by pulling two pieces of intertwined cord, each passing through a hole in the proximity of the centre of the disc.

The arrangement according to the invention offers the following advantages over known arrangements intended for the purpose described:

(1) Because the air is sucked through the indicating means by pumping action practically all impurities and contaminating matter in the air will be picked up and absorbed, so as to afford not only a qualitative but also in the majority of cases a satisfactory quantitative determination of the contaminations.

(2) Since it is possible in a preliminary step to prepare the indicating means with suitable reactants, and since the indicating means can be mounted in the arrangement in a preliminary step or removed from and replaced in the arrangement by a simple manual operation, the time taken to effect a testing operation is very short, which is an important advantage when determining the possible presence of harmful and dangerous substances in time of conflict or war, where a gain in time of just a few seconds can be of the utmost importance.

(3) The arrangement can be caused to rotate at the requisite high number of r.p.m. by means of the suggested operating arrangement. Tests have shown that the speed of rotation may exceed 50,000 r.p.m. Because of the high speed of rotation the arrangement according to the invention can be given very small dimensions and a low weight whilst still retaining a high degree of efficiency; a factor which adds to its suitability, particularly for use in military action and also due to the low manufacturing costs makes it suitable for one-time use.

(4) Because of its simple design the suggested arrangement is well suited for mass production, for one-time use.

DETAILED DESCRIPTION OF INVENTION

The invention will now be described more in detail with reference to the accompanying drawings, in which FIGURE 1 shows a partly cut away perspective view of an apparatus according to the invention;

FIGURE 2 shows a perspective view of a second embodiment of the invention;

FIGURE 2a shows a perspective view of a removable carrier usable with the embodiment of FIGURE 2;

FIGURES 7 and 8 show diagrams illustrating calibrating examples.

Figure 3:
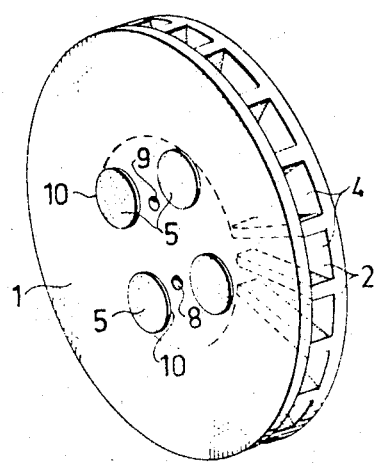
FIGURE 3 illustrates a suitable embodiment of indicating means for semi-quantitative testing purposes, FIGURES 3a to 3d showing various embodiments of a part of the indicating menas.

A circular disc 1 is provided with radial channels 2 having inlets 3 adjacent the centre of the disc and outlets 4 at the periphery of said disc. The inlets are provided with indicating means 5 (SORBENTS) capable of being through passed by air and comprising, for instance, filter paper, for absorbing gases or aerosols.

Each of two cords 6, 7, which are twisted around one another, passes through a different hole 8, 9 in the proximity of the centre of the disc. The ends of the cords are secured to handles 11, 12. The disc can be caused to rotate very rapidly in alternate directions by intermittently pulling the handles manually in axial direction. During the rotation the disc will act as an air pump, sucking air through the indicating means 5. Mounted on the disc around the indicating means are differently coloured rings 10, intended for identifying the various substances. The ends of the two cords are joined together by means of the handles 11, 12 which consist of pieces of rubber hose mounted around the ends of the cords, so as to facilitate operation of the apparatus.

In the embodiment shown in FIGURE 2 the indicating means 5 together with the associated inlets are arranged on a carrier 13, which is removably arranged on the disc 1. The carrier 13 can be pushed into a pocket formed by a flange 14 and fixed in this position, for example by means of a pin 15 adapted to be inserted into a corresponding hole 16 on the carrier. Colour markings 17 may suitably be affixed on the top of the flange 14, on one or both sides of the respective indicating means. The embodiment of the arrangement shown in FIGURE 2 can thus be prepared for repeated use in a simple manner.

In the embodiment of the invention shown in FIGURE 3, throttle plates 18 of different dimensions are inserted behind the indicating means 5, whereby different selected quantities of air may be sucked through the indicating means. Thus, for a reactant or reagent agent having a specific sensitivity a clearly marked colouring will be obtained on the two indicating means placed in those air intakes through which the largest quantity of air passes during a testing operation, whereas a lesser colouring will be obtained on the indicating means passed by a smaller quantity of air and no colouring will be shown on the indicating means at which the heaviest throttling of the air takes place. The described arrangements can be used in the following manner for instance.

To indicate or detect the presence of a specific poisonous or contaminating substance, for instance carbon monoxide, it is more expedient to use indicating means of a kind giving a colour indication directly while the testing is performed. If, for instance, palladium chloride is used the indicating means will turn black in the presence of carbon monoxide, due to reduction to free palladium. Naturally, other reagents may also be used and contaminating substances and gases other than carbon monoxide may be detected or indicated.

If only one poisonous or contaminating substance among a number of possible ones is to be detected or indicated an arrangement is used, which comprises a plurality of indicating means for absorbing gases and aerosols. When samples have been taken different reagents are applied to the various indicating means. If, for this purpose, dimethyl amino benzaldehyde and phenyl naphthyl amine are used as a phosgene reagent the indicating means will turn green in the presence of this substance.

Naturally, it is also possible to use the arrangement according to the present invention to investigate the degree of contamination and impurification of aerosols in the air, by subjecting, in a known manner, the material absorbed on the indicating means, subsequent to sampling, to a quantitative determination, e.g. gravimetrically or, subsequent to removing the indicating means from the arrangement, by conventional analytical methods.

Figure 4:
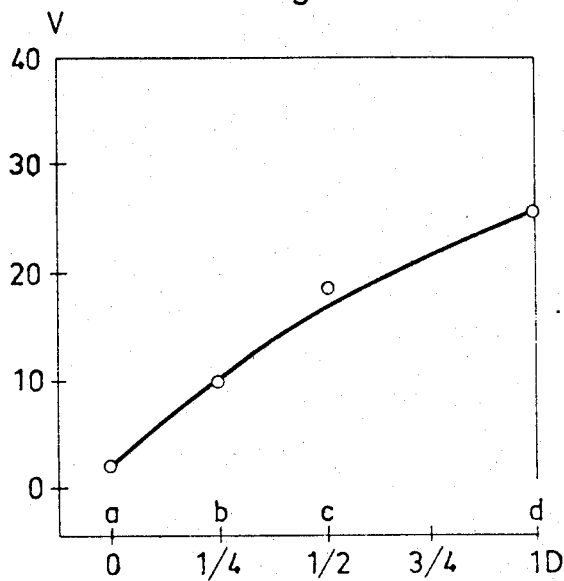
FIGURES 4–6 show diagrams illustrating the absorbing capacity of the indicating means, when throttle plates are used, as well as the pressure and volume characteristics of the arrangement.

Results obtained when throttling the air channels situated behind the indicating means 5, described with reference to FIGURE 3, are more closely illustrated in the diagrams shown in FIGURES 4 and 5. The diagram according to FIGURE 4 illustrates the relative weight V of aerosol absorbed on the different indicating means $a$, $b$, $c$, $d$ when the diameters D of the channels to the air inlets have been throttled to different extents.

Figure 3A:
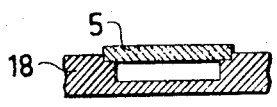
Figure 3B:
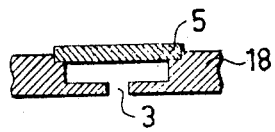
Figure 3C:
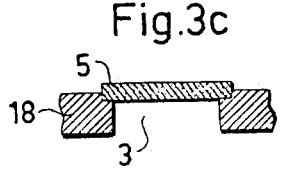
Figure 3D:
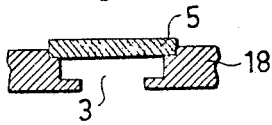

In one test there was used a rotatable disc (FIG. 4) having a diameter of 40 mm. and a weight of about 2.5 g. The diameter of the air-inlets was 4 mm. and the diameter of the largest throttle plate (arranged behind the indicating means $a$) also was 4 mm. A mist of zinc chloride was used in the test as a test medium and the weights V disclosed in the diagram were determined by weighing the indicating means on completion of the testing operation. When weighing the amount of test substance on the indicating means $d$, which was subjected to normal throughsuction of air, it was found that said weighed amount corresponded to about 85% of the amount of test substance present in the sample air. The amount by weight of test substance absorbed on the indicating means $a$ was caused by an impact effect, since in this instance the air channel was completely closed by means of a throttle plate (FIG. 3a).

Figure 5:
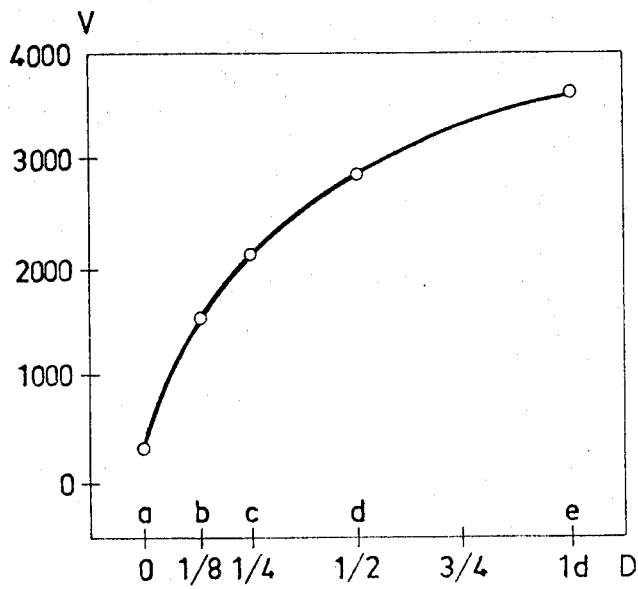

The result of a similar test for determining the presence of gaseous contaminations can be seen from the diagram shown in FIGURE 5. In this test the diameter of the rotary disc 1 which weighed approximately 2.5 g. was also 40 mm. The disc 1 was provided with five air intakes, each having a diameter of 4 mm. and gel coated cellulose filters were used as indicating means $a$ to $e$. The diameter D of the largest throttle plate was 4 mm., i.e. the same as the diameter of the air intakes and indicating means; radium active substance such as tritium marked acetic acid anhydride was used as a test substance. As can be seen from the diagram the amounts absorbed by the indicating means are not directly proportional to the degree of throttling, which is thought to be the result of an increased pressure drop across the indicating means upon an increase in air speed, and changed filtering effect. The amount measured on the indicating means $a$ is mainly caused by, inter alia, the diffusion effect, since in this instance the air channel is completely closed by a throttle plate having the same diameter as the diameter of the air intake.

Figure 6:
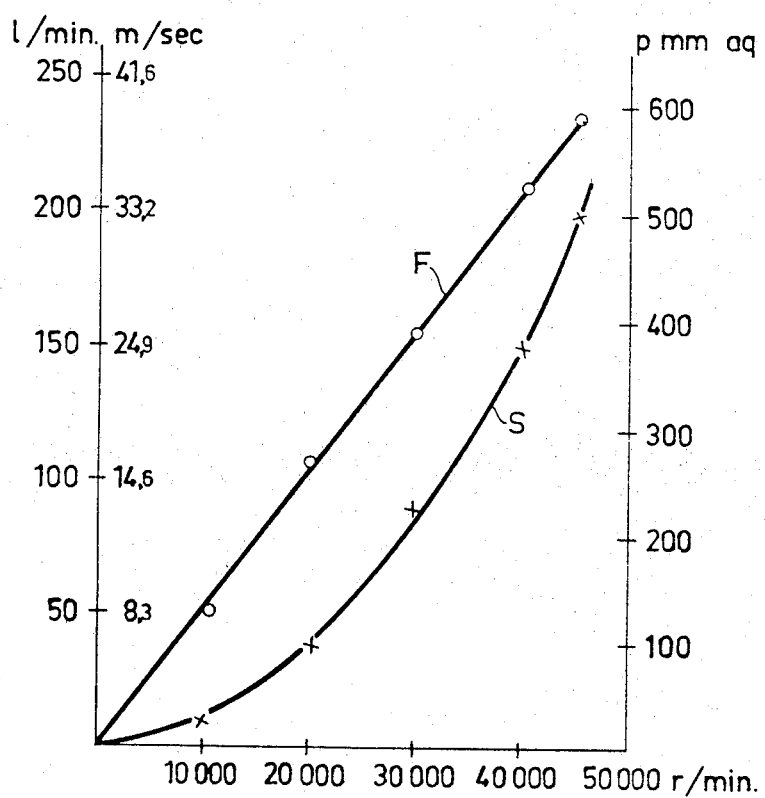

To ascertain the pressure and volume capacity etc. of the arrangement a number of tests were made, inter alia with an arrangement including a disc having a diameter of 40 mm., a weight of about 2.5 g., a thickness of 4 mm. and an inlet area of 1 cm.$^2$. The arrangement was rotated during the test by means of an electric motor, in a test bench. The obtained values are shown in the diagram of FIGURE 6. In this figure the left vertical axis indicates the free flow of air in liters/minute at an inlet area of 1 cm.$^2$, and the speed of flow of the air in meter/sec. Along the right vertical axis there is indicated the static subatmospheric pressure p in mm. water column (flow=0). The horizontal axis indicates the rotational speed of the disc in revolutions per minute. Curve F indicates the air flow and Curve S the static subatmospheric pressure.

It has been shown according to further tests that the arrangement according to the present invention can be accelerated by means of the manual drive means, up to a top speed of more than 50,000 revolutions per minute. Consequently, the arrangement will operate as a pump, presenting a very high characteristic with regard to static pressure and volume capacity. It has also been found that the maximum speed increases with reduced diameter, and since higher speeds increase the capacity of the arrangement with regard to the amount of air sucked through per unit area of the indicating surface the diameter of the disc should be made as small as practically suitable for the purpose intended. It should be observed in this context that the weight of the disc and the nature of the driving cords are also factors which influence the speed of rotation.

FIGURES 7 and 8 show diagrammatically calibration examples of an air testing apparatus according to the invention. The disc 1 consists of cardboard having a diameter of 40 mm., a weight of 2.5 g. and four indicating means provided with air inlets with a diameter of 3.5 mm.

According to FIG. 7 the disc is driven by an electric motor with controllable rotational speed in a testing bench for determining the pressure and volume characteristics etc. of the disc. Along the vertical axis there is plotted the quantity of air A in liters per minute sucked through the indicating means, as well as the quantity of air B in liters per minute without any indicating means or filters. Along the horizontal axis there is plotted the rotation speed of the disc in r.p.m. The Curve X shows the air flow without indication means of filters and Curve Y shows the air flow with indicating means or filters.

FIGURE 8 illustrates a calibration example in which the disc is rotated manually. The rotational speed r/min. has been plotted from oscillascope recordings. Along the vertical axis to the right there is plotted the quantity of air in liters/minute sucked through the indicating means or filters. The time per pump stroke is 0.6 sec. and has been indicated at T. The cross-hatched area shows the integrated quantity of air=10 liters/minute. Curve Z represents the rotational speed and Curve U the air flow.

The indicating means employed in the arrangement according to the present invention may comprise filter paper or some other suitable material, and may be prepared with a suitable reagent or reactant agent either before the testing operation or after a test has been made.

Because of its simplicity, and especially if made of cardboard or plastic for one-time use purposes, the arrangement according to the invention can be produced very cheaply and therefore, by way of example, may be included at low cost in gas mask equipments of every civilian and all military personnel.

In the case of one-time use only the arrangement may, after being used, serve as a toy, and for this purpose it can easily be provided with a device which emits sound during rotation of the disc.

Further, the testing time when using the present arrangement is very short and no exhaustive preparatory or subsequent work is necessary, which is of decisive significance when used in times of conflict and war.

The present invention provides an effective instrument, perfectly satisfactory with regard to accuracy, for a rapid determination of any impurities and contaminations which may be present in air and other gases. This favourable result is obtained since very small amounts of a substance can be detected and indicated due to the concentration or enrichment of the testing substance on the indicating means, provided by the pumping effect, and since a plurality of samples can be taken simultaneously, the result being that a plurality of substances can be detected and indicated at the same time if the indicating means are prepared with different reagent combinations.

The invention is not restricted to the embodiments now described and shown but may be subjected to various modifications and changes within the scope of the claims.

We claim:
1. An arrangement for indicating impurities and contaminating and poisonous substances in air, other gases or vapours, comprising indicating or detecting means carried by a rotatable disc-like member, having radial channels which at the periphery of the disc open out into ports serving as air outlets and which in the proximity of the center of the disc communicates with ports serving as air inlets including said indicating or detecting means, means for rapidly rotating said disc around the center of said disc to produce a pumping action between inlet and outlet.

2. The arrangement set forth in claim 1, wherein the indicating or detecting means are removably or exchangeably fitted in or at said air inlet ports.

3. The arrangement set forth in claim 1, wherein the indicating or detecting means are arranged on a carrier adapted to be removably mounted on the disc.

4. The arrangement set forth in claim 3, wherein the carrier is adapted to be inserted into a pocket formed by a flange and arranged to be fixed in its inserted position by means of a pin projecting from the disc and intended to be introduced into a bore in said carrier.

5. The arrangement set forth in claim 4, wherein the outer surface of the flange presents colour markings, substantially at the same level as the indicating or detecting means.

6. The arrangement set forth in claim 1, wherein means are provided for throttling the flow area of said air inlet ports.

7. The arrangement set forth in claim 6, wherein throttle plates are removably arranged in said ports, for the purpose of throttling the flow area of said ports selectively.

8. The arrangement of claim 1 wherein the means for rotating said disc comprises at least two intertwined cords, each of which passes through a different hole adjacent the center of the said disc.

References Cited

UNITED STATES PATENTS 676,125  6/1901  Falardeau _____ 46—63
2,234,499  3/1941  McAllister _____ 23—254

RICHARD C. QUEISSER, Primary Examiner

E. J. KOCH, Assistant Examiner

U.S. Cl. X.R.

73—23